(12) United States Patent
Jesperson

(10) Patent No.: US 6,431,533 B1
(45) Date of Patent: Aug. 13, 2002

(54) SHEET MATERIAL SUPPORTING APPARATUS

(76) Inventor: Thomas Francis Jesperson, 30 George Street, Caloundra QLD 4551 (AU)

( * ) Notice: Subject to any disclaimer, the term of this patent is extended or adjusted under 35 U.S.C. 154(b) by 0 days.

(21) Appl. No.: 09/581,695

(22) PCT Filed: Dec. 18, 1998

(86) PCT No.: PCT/AU98/01058

§ 371 (c)(1),
(2), (4) Date: Aug. 21, 2000

(87) PCT Pub. No.: WO99/32391

PCT Pub. Date: Jul. 1, 1999

(30) Foreign Application Priority Data

Dec. 18, 1997 (AU) .............................. 48436/97

(51) Int. Cl.[7] ................................. B25B 1/00
(52) U.S. Cl. ............................. 269/3; 269/133; 269/238
(58) Field of Search ................................. 269/237, 238, 269/239, 133, 3; 254/30, 132

(56) References Cited

U.S. PATENT DOCUMENTS 136,907 A * 3/1873 Dexter ........................ 269/238
556,689 A * 3/1896 Oliver ........................ 254/132

* cited by examiner

Primary Examiner—Robert C. Watson
(74) Attorney, Agent, or Firm—Rodman & Rodman

(57) ABSTRACT

An apparatus for supporting sheet material includes clamping means (16) having opposed jaws (60, 62) arranged to releaseably clamp sheet material therebetween and handle means (14) located, in use, below the clamping means (16) for use in manual lifting of the apparatus and sheet material clamped between the jaws (60, 62).

16 Claims, 6 Drawing Sheets

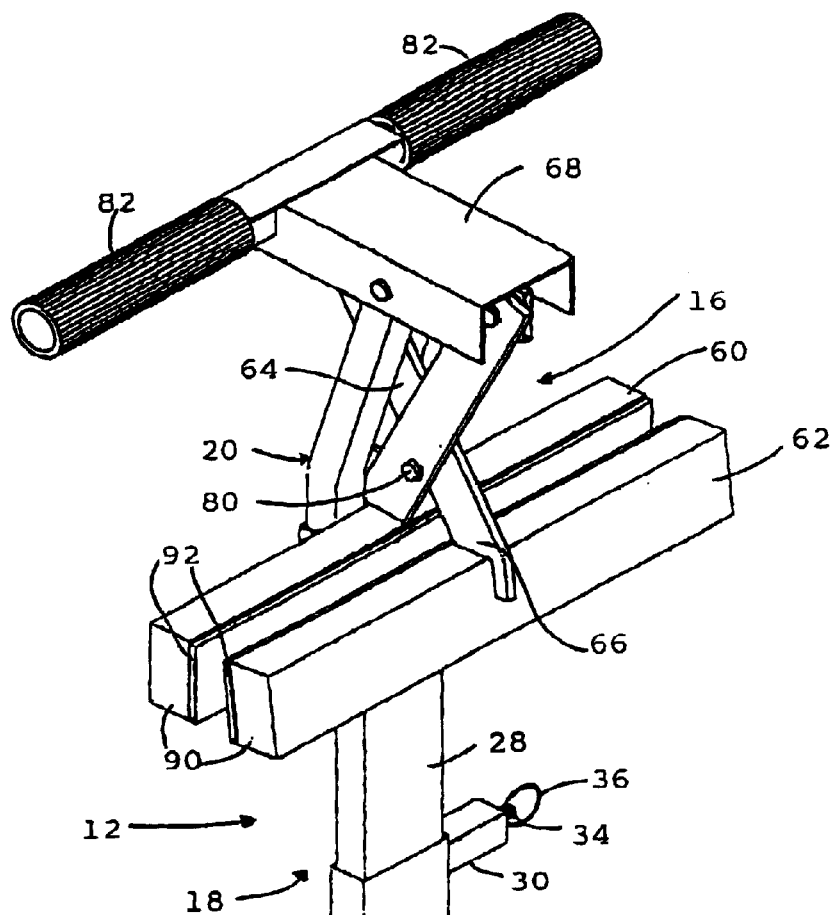
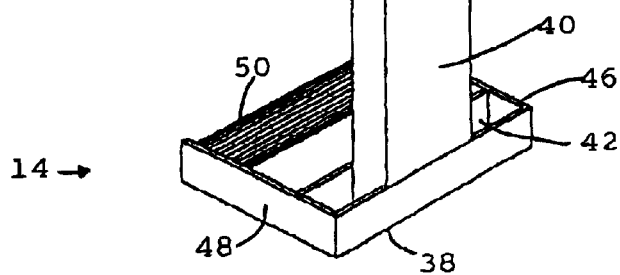

SHEET MATERIAL SUPPORTING APPARATUS

FIELD OF THE INVENTION

The present invention relates to an apparatus for supporting sheet material. Throughout this specification the expression "sheet material" is to be understood to mean sheets or pieces of planar or substantially planar material such as plasterboard, glass, masonite, chipboard, metal including corrugated iron, particle board, plywood and the like.

BACKGROUND

Manual lifting and carrying of sheet material is typically performed by one of two techniques. An upper edge of the sheet may be placed to abut the armpit of the carrier with the carrier's hands placed over the upper edge. The sheet is grasped between the fingers and palms of the hands and may also be supported between the upper arm and torso of the carrier. Alternatively, a lower edge of the sheet may be elevated to enable the fingers of one of the carrier's hands to be placed under the lower edge with the fingers of the other hand placed over an upper edge of the sheet. Both techniques are somewhat awkward with the result that there is the potential of injury to the carrier.

SUMMARY OF THE PRESENT INVENTION

The present invention provides an apparatus for supporting sheet material, the apparatus including:

clamping means having opposed jaws arranged to releaseably clamp sheet material therebetween; and handle means located, in use, below the clamping means for use in manual lifting of the apparatus and sheet material clamped between the jaws.

Preferably, the clamping means is arranged such that, in use, the greater the load supported by the apparatus, the greater the clamping force exerted between the opposed jaws.

Preferably, the apparatus further includes a body member wherein, in use, the clamping means is located adjacent an upper portion of the body member and the handle means is located adjacent a lower portion of the body member.

Preferably, one of the opposed jaws is mounted to the body member by bracket means which restrict movement of said one of the jaws relative to the body member other than movement longitudinally parallel to the body member.

Preferably, the clamping means includes actuator means mounted to the body member for actuating the opposed jaws of the clamping means.

Preferably, the actuator means is pivotally mounted atop the body member, the actuator means is pantographically connected to the opposed jaws, and rotation of the actuator means about its pivotal mounting to the body means induces relative movement between the opposed jaws.

Preferably, a handgrip extends from the actuator means for operation of the actuator means.

Preferably, in use, lifting of the handgrip causes opening of the opposed jaws and upward movement of the opposed jaws relative to the body member.

Preferably, the distance between the handgrip and the handle means is variable.

BRIEF DESCRIPTION OF THE DRAWINGS

Preferred embodiments of the present invention will now be described, by way of example only, with reference to the accompanying drawings, in which:

FIGS. 1–4 are isometric views of an apparatus according to the present invention viewed from different directions.

BEST MODE OF CARRYING OUT THE INVENTION

Figure 2:
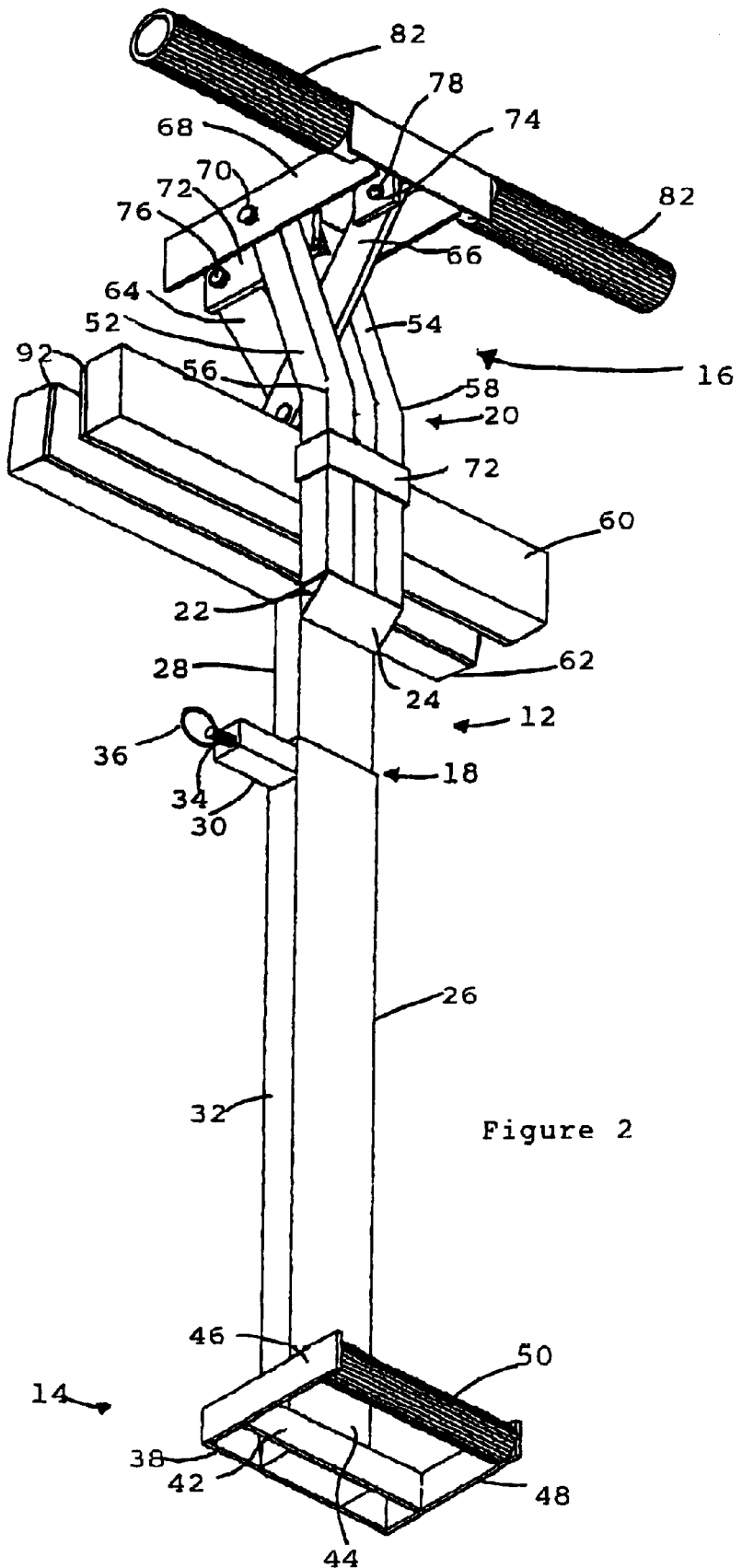

Referring firstly to FIGS. 1 and 2, the apparatus 10 broadly comprises a body member 12, handle means 14 and clamping means 16. The body member 12 is comprised of a lower member 18 and upper member 20 which are secured together at contacting edges 22 (see FIG. 2). The lower and upper members 18 and 20 respectively are further secured together via a plate 24 which is welded via its lower and upper edges to the lower and upper members 18 and 20 respectively.

The lower member 18 of the body member 12 is comprised of two substantially rectangular aluminium tubes 26 and 28 which are sized such that tube 28 can slide within tube 26. Relative longitudinal movement of tube 26 relative to tube 28 is prevented by a locating portion 30 which extends from a side 32 (see FIG. 2) of the tube 26.

Attachment of the locating portion 30 to the tube 26 is such that a pin 34 is forced against the side 32 of the tube 26 by an internal spring (not shown) of the locating portion 30. Receipt of the pin 34 into holes (not shown) in the side 32 of the tube 26 results in the tube 26 being located longitudinally relative to the locating portion 30. A ring 36 which is attached to the pin 34 enables the pin 34 to be withdrawn from the locating portion 30 against the tension of the internal spring (not shown) in a direction away from the side 32 of the tube 26 such that the pin 34 is withdrawn from one of the holes (not shown) in the side 32 of the tube 26. Such withdrawal of the pin 34 from the locating portion 30 allows relative longitudinal movement of the tube 26 with respect to the tube 28. The holes (not shown) in the side 32 of the tube 26 are located such that the handle means 14 can be appropriately positioned relative to the clamping means 16. Alternatively, the handle means 14 may be adjustable longitudinally relative to a one-piece lower member 18.

The handle means 14 comprises a U-shaped strap 38 which attaches to a side 40 (see FIG. 1) of the tube 26. A strap 42 attaches to a side 44 (see FIG. 2) of the tube 26 and to inside surfaces of the U-shaped strap 38 via its end to more securely attach the U-shaped strap 38 to the tube 26. Sides 46 and 48 of the U-shaped strap 38 are joined via their inside surfaces by a cylindrical handle 50. The external surface (not shown) of the cylindrical handle 50 is enclosed by a cylindrical neoprene tube.

Figure 5:
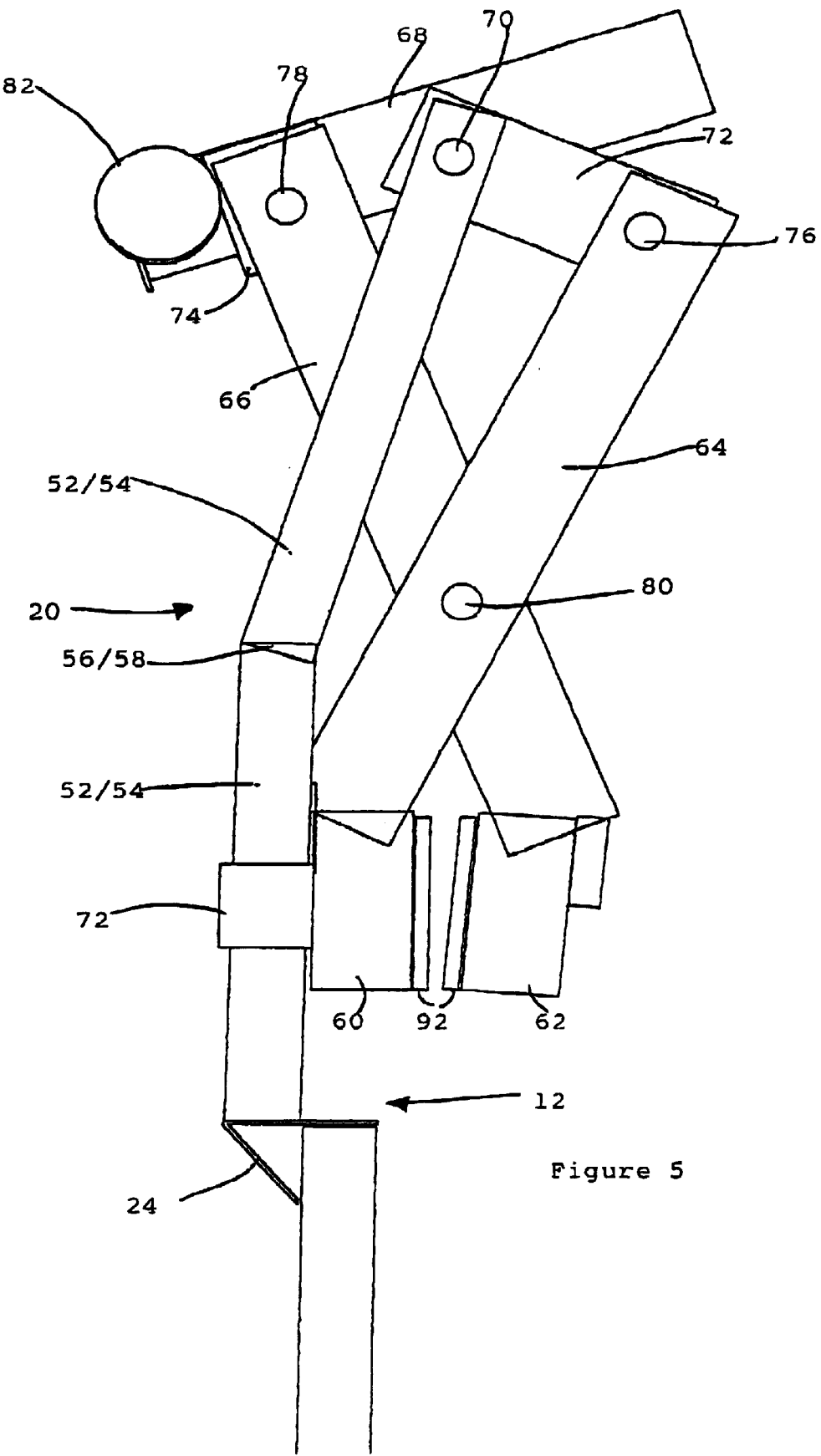
FIG. 5 is a side elevation of the apparatus according to FIGS. 1–4 wherein jaws of the apparatus are in a closed position.
Figure 6:
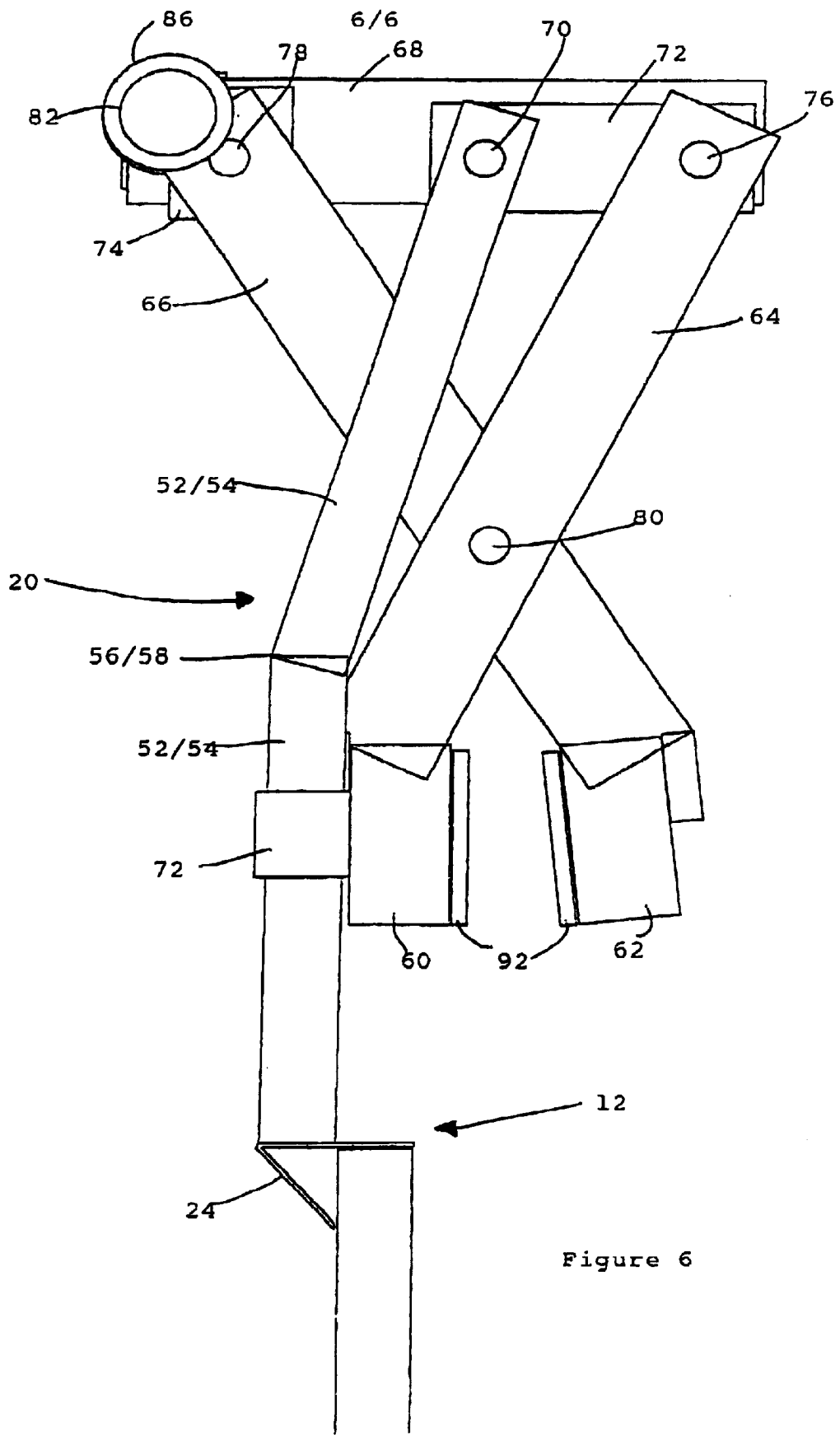
FIG. 6 is a view similar to FIG. 5 wherein the jaws are in an open position.

Referring to FIGS. 2, 5 and 6 the upper member 20 of the body member 12 comprises two substantially rectangular tubes 52 and 54 which extend upwardly from the plate 24 until bend regions 56 and 58 of the tubes 52 and 54 respectively. Each of the tubes 52 and 54 bend in substantially only one plane at the bend regions 56 and 58 wherein the planes are substantially parallel. The tubes 52 and 54 extend substantially linearly above the bend regions 56 and 58.

Figure 3:
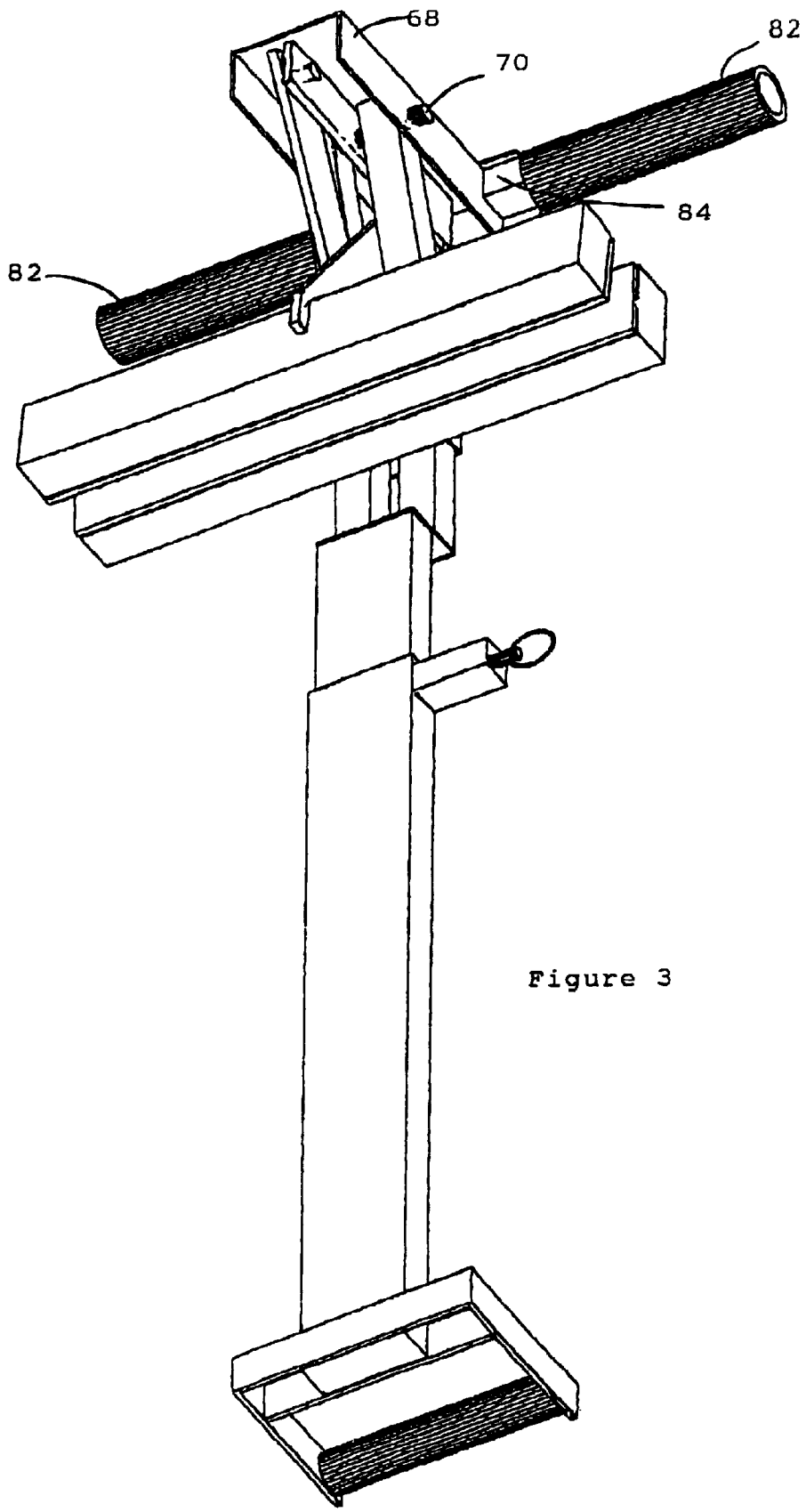
Figure 4:
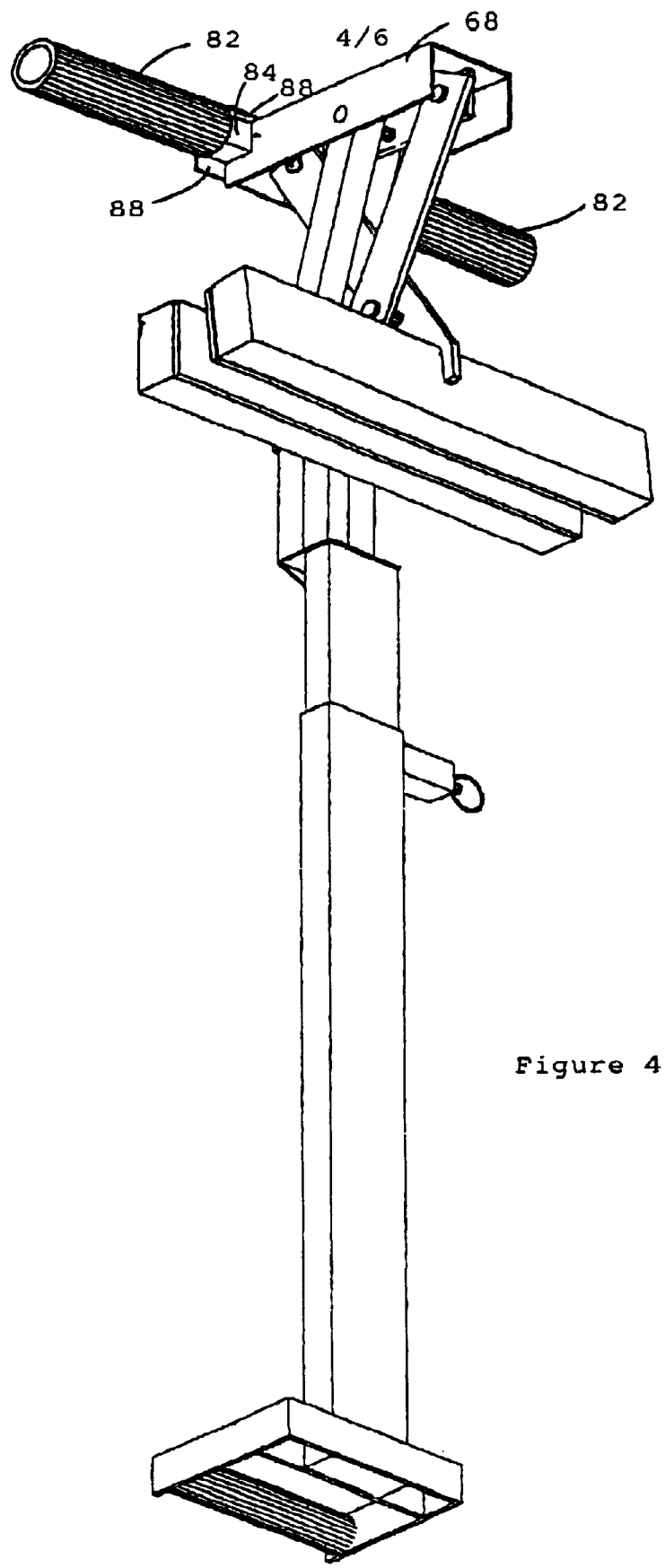

The clamping means 16 comprises jaws 60 and 62 which are pantographically connected via straps 64 and 66 respectively to actuator means 68. Movement of the jaws 60 and 62 is controlled by pivotal movement of the actuator means 68 about bolt 70 which attaches the actuator means 68 to the tubes 52 and 54 of the body member 12. Bracket means 72 restrict the jaws 60 and 62 to move longitudinally parallel to the tubes 52 and 54 in the region between the upper edge of the plate 24 and the bend regions 56 and 58. The straps 64 and 66 attach to the actuator means 68 via straps 72 and 74 respectively. One end of the strap 72 is pivotally attached to the strap 64 via a bolt 76 while the other end of the strap 72 is pivotally attached to the bolt 70. Strap 74 is fixed to the actuator means 68 and strap 66 is pivotally attached to the strap 74 via a bolt 78. Referring to FIG. 1 the straps 64 and 66 are pivotally attached at substantially their respective mid-points via a bolt 80. Referring to FIGS. 3 and 4 handgrips 82 which attach to side portions of the actuator means 68 via rectangular tube portions 84 enable the pivotal movement of the actuator means 68 to be controlled by an operator. Neoprene tubes 86 (see FIG. 6) surround the cylindrical handgrips 82. Referring to FIG. 4 a bracket 88 to an end and upper portion of the actuator means 68 proximal to the handgrips 82.

The jaws 60 and 62 are comprised of rectangular tubes which are enclosed at both ends by caps 90 (see FIG. 1) which have protruding edges whose external dimensions are such that the protruding edges fit firmly against the inside surfaces of the jaws 60 and 62 to locate the end caps rigidly thereto. opposing surfaces of the jaws 60 and 62 are covered with neoprene pads 92.

Operation of the clamping means 16 of the apparatus 10 will now be described with reference to FIGS. 5 and 6. Movement of the handgrips 82 from the position as shown in FIG. 5 to that shown in FIG. 6 results in rotation of the clamping actuator 68 about the bolt 70 which is fixed relative to upper ends of tubes 52 and 54. Such rotational movement results in an upper end of the strap 66 rotating upwardly about the bolt 70. Upward movement of the strap 66 results in upward movement of the bolt 80 which connects the straps 64 and 66. Consequential upward movement of an upper end of the strap 64 about the bolt 70 from the position as shown in FIG. 5 to that shown in FIG. 6 results in jaw 60 moving longitudinally relative to the tubes 52 and 54 in an upward direction because jaw 60 is constrained via the strap 72. Because upper ends of the straps 64 and 66 respectively are constrained to move in an arc about the pivot bolt 70 to a position where the upper ends of the straps 64 and 66 are substantially aligned with the pivot 70, the upper ends of the straps 64 and 66 respectively are forced apart from each other in moving from the position as shown in FIG. 5 to that shown in FIG. 6. Because the straps 64 and 66 are attached via the pivot bolt 80 the movement of the upper ends of the straps 64 and 66 respectively from the position as shown in FIG. 5 to that shown in FIG. 6 results in corresponding equivalent movement of the opposite ends of the straps 64 and 66 from the position as shown in FIG. 5 to that as shown in FIG. 6 with the jaws 60 and 62 forced to move a closed position as shown in FIG. 5 to an open position as shown in FIG. 6.

In moving the handgrips 82 from the position as shown in FIG. 6 to that as shown in FIG. 5 the reverse of the operation described above results in the jaws 60 and 62 moving from an open position as shown in FIG. 6 to a closed position as shown in FIG. 5.

The way in which the apparatus 10 is typically used to fulfil its desired function will now be described below with reference to FIGS. 1–6. The apparatus 10 is typically lifted via handgrips 82 and positioned appropriately relative to a sheet such that an upper edge of the sheet is positioned between the open jaws 60 and 62 as per FIG. 6. By lowering the open jaws 60 and 62 of the apparatus 10 over the sheet the weight of the apparatus 10 is gradually supported by the sheet which results in the handgrips 82 lowering with respect to the pivot bolt 70 as shown in FIG. 5. Depending on the thickness of the sheet it is desirable that the handgrips 82 are rotated downwardly while positioning the jaws 60 and 62 relative to the sheet such that the weight of the apapratus 10 is not supported by inside edges of the straps 64 and 66 which could result in the upper edge of the sheet being damaged. Such lowering of the handgrips 82 result in the jaws 60 and 62 moving toward the closed position as shown in FIG. 5 with the sheet clamped firmly between the neoprene pads 92. To prevent contact between upper edge of the sheet and the inside edges of the straps 64 and 66, the upper edges of the jaws 60 and 62 may be spanned by a stop or series or stops comprised of, for example, plastics material which do not inhibit opening and closing of the jaws 60 and 62 but which bear against the upper edge of a sheet before it contacts straps 64 and 66.

It should be noted that the clamping means 16 is biassed such that the lowest energy state of the clamping means 16 is the closed position as shown in FIG. 5. As such, when the handgrips 82 are released the jaws 60 and 62 close and clamp the sheet between the neoprene pads 92.

Either before or after the apparatus 10 is clamped to the sheet, the tube 26 can be adjusted longitudinally relative to the tube 28 by operation of the locating portion 30. Sheets are typically of standard sizes and as such the holes (not shown) in the side of the tube 28 may be positioned such that when the jaws 60 and 62 of the apparatus 10 are clamped over the sheet the handle means 14 extends appropriately below the upper edge of the sheet such that the sheet can be lifted ergonomically by an operator via the handle 50 while supporting the upper end of the appartus 10 via one or other of the handgrips 82.

Ergonomic operation of the apparatus 10 is typically achieved by an operator bending at his/her knees while keeping his/her back relatively straight to enable a first hand to grasp the handle 50 such that subsequent straightening of the knees results in upward movement of the apparatus 10 and the sheet supported by the apparatus 10. While an operator straightens his/her knees to provide the upward movement of the apparatus 10 via a first hand a second hand of the operator can be used to grasp loosely either of handgrips 82 such that the upper end of the apparatus 10 is held proximal to the operator and therefore prevented from falling away from the operator as the upward force is provided to the handle 50.

It should be noted that the clearance between the inside surfaces of the jaws 60 and 62 in the closed position, the thickness of the neoprene pads 92 and the co-efficient of friction of the neoprene pads 92 are such that the mass of a sheet which is loosely clamped between the neoprene pads 92 results in a slight downward movement of the jaws 60 and 62, the clearance between the inside surface of the jaws 60 and 62 being further reduced and the sheet being more firmly clamped between the jaws 60 and 62. That is to say that the arrangement of the clamping means 16 is such that the greater the load supported by the apparatus 10, the greater the clamping force exerted between the jaws 60 and 62.

What is claimed is:

1. An apparatus for supporting sheet material the apparatus including:

clamping means having opposed jaws arranged to releasably clamp sheet material therebetween;

handle means located, in use, below the clamping means for use in manual lifting of the apparatus and sheet material clamped between the jaws;

a body member wherein, in use, the clamping means is located adjacent an upper portion of the body member and the handle is located adjacent a lower portion of the body member; and wherein one of the opposed jaws is mounted to the body member by bracket means which restrict movement of said one of the jaws relative to the body member other than movement longitudinally parallel to the body member.

2. An apparatus as claimed in claim 1 wherein the clamping means is arranged such that, in use, the greater the load supported by the apparatus, the greater the clamping force exerted between the opposed jaws.

3. An apparatus as claimed in claim 1 wherein the clamping means includes actuator means mounted to the body member for actuating the opposed jaws of the clamping means.

4. An apparatus as claimed in claim 3 wherein the actuator means is pivotally mounted atop the body member, the actuator means is pantographically connected to the opposed jaws, and rotation of the actuator means about its pivotal mounting to the body means induces relative movement between the opposed jaws.

5. An apparatus as claimed in claim 4 wherein a handgrip extends from the actuator means for operation of the actuator means.

6. An apparatus as claimed in claim 5 wherein, in use, lifting of the handgrip causes opening of the opposed jaws and upward movement of the opposed jaws relative to the body member.

7. An apparatus as claimed in claim 1 wherein the distance between the handgrip and the handle means is variable.

8. An apparatus for supporting sheet material, the apparatus including:

clamping means having opposed jaws arranged to releaseably clamp sheet material therebetween;

handle means located in use, below the clamping means for use in manual lifting of the apparatus and sheet material clamped between the jaws;

wherein the clamping means includes actuator means mounted to the body member for actuating the opposed jaws of the clamping means;

wherein the actuator means is pivotally mounted atop the body member, the actuator means is pantographically connected to the opposed jaws, and rotation of the actuator means about its pivots mounting to the body means induces relative movement between the opposed jaws;

wherein a handgrip extends from the actuator means for operation of the actuator means; and wherein, in use, lifting of the handgrip causes opening of the opposed jaws and upward movement of the opposed jaws relative to the body member.

9. An apparatus as claimed in claim 8, wherein the clamping means is arranged such that, in use, the greater the load supported by the apparatus, the greater the clamping force exerted between the opposed jaws.

10. An apparatus as claimed in claim 8 further including a body member wherein, in use, the clamping means is located adjacent an upper portion of the body member and the handle means is located adjacent a lower portion of the body member.

11. An apparatus as claimed in claim 10 wherein one of the opposed jaws is mounted of the body member by bracket means which restrict movement of said one of the jaws relative to the body member other than movement longitudinally parallel the body member.

12. An apparatus as claimed in claim 8 wherein the distance between the handgrip and the handle means is variable.

13. An apparatus for supporting sheet material, the apparatus including:

clamping means having opposed jaws arranged to releaseably clamp sheet material therebetween;

handle means located, in use, below the clamping means for use in manual lifting of the apparatus and sheet material clamped between the jaws;

wherein the clamping means includes actuator means mounted to the body member for actuating the opposed jaws of the clamping means;

wherein the actuator means is pivotally mounted atop the body member, the actuator means is pantographically connected to the opposed jaws, and rotation of the actuator means about its pivotal mounting to the body means induces relative movement between the opposed jaws;

wherein a handgrip extends from the actuator means for operation of the actuator means; and wherein the distance between die handgrip and the handle means is variable.

14. An apparatus as claimed in claim 13 wherein the clamping means is arranged such that, in use, the greater the load supported by the apparatus, the greater the clamping force exerted between the opposed jaws.

15. An apparatus as claimed in claim 13 further including a body member wherein, in use, the clamping means is located adjacent an upper portion of the body member and the handle means is located adjacent a lower portion of the body member.

16. An apparatus as claimed in claim 15 wherein one of the opposed jaws is mounted to the body member by bracket means which restrict movement of said one of the jaws relative to the body member other than movement longitudinally parallel to the body member.

* * * * *